(12) United States Patent
Marks et al.

(10) Patent No.: US 8,761,434 B2
(45) Date of Patent: Jun. 24, 2014

(54) TRACKING SYSTEM CALIBRATION BY RECONCILING INERTIAL DATA WITH COMPUTED ACCELERATION OF A TRACKED OBJECT IN THE THREE-DIMENSIONAL COORDINATE SYSTEM

(75) Inventors: Richard Lee Marks, Pleasanton, CA (US); Eric Larsen, Foster City, CA (US)

(73) Assignee: Sony Computer Entertainment Inc., Tokyo (JP)

(*) Notice: Subject to any disclaimer, the term of this patent is extended or adjusted under 35 U.S.C. 154(b) by 958 days.

(21) Appl. No.: 12/435,386

(22) Filed: May 4, 2009

(65) Prior Publication Data
US 2010/0150404 A1  Jun. 17, 2010

Related U.S. Application Data

(60) Provisional application No. 61/138,499, filed on Dec. 17, 2008.

(51) Int. Cl.
*G06K 9/00* (2006.01)
(52) U.S. Cl.
USPC ............................. 382/103; 382/107; 382/154
(58) Field of Classification Search
None
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger | |
| 5,128,671 A | 7/1992 | Thomas, Jr. | |
| 5,297,061 A | 3/1994 | Dementhon et al. | |
| 5,454,043 A | 9/1995 | Freeman | |
| 5,528,265 A | 6/1996 | Harrison | |
| 5,616,078 A | 4/1997 | Oh | |
| 5,764,786 A * | 6/1998 | Kuwashima et al. | 382/107 |
| 5,850,469 A | 12/1998 | Martin et al. | |
| 5,912,700 A * | 6/1999 | Honey et al. | 348/157 |
| 6,157,368 A | 12/2000 | Faeger | |
| 6,286,104 B1 | 9/2001 | Buhle et al. | |

(Continued)

FOREIGN PATENT DOCUMENTS

| | | |
|---|---|---|
| EP | 0 587 138 A2 | 3/1994 |
| EP | 2359223 | 8/2011 |

(Continued)

OTHER PUBLICATIONS

PCT International Search Report and Written Opinion for International Application No. PCT/US09/50312, mailed Nov. 10, 2009, 8 pages.

(Continued)

*Primary Examiner* — Jayesh A Patel
(74) *Attorney, Agent, or Firm* — Blakely, Sokoloff, Taylor & Zafman LLP

(57) ABSTRACT

To calibrate an positional sensor, a plurality of image locations and image sizes of a tracked object are received as the tracked object is moved through a rich motion path. Inertial data is received from the tracked object as the tracked object is moved through the rich motion path. Each of the plurality of image locations is converted to a three-dimensional coordinate system of the positional sensor based on the corresponding image sizes and a field of view of the positional sensor. An acceleration of the tracked object is computed in the three-dimensional coordinate system of the positional sensor. The inertial data is reconciled with the computed acceleration, calibrating the positional sensor.

33 Claims, 13 Drawing Sheets

(56) References Cited

U.S. PATENT DOCUMENTS

| | | | |
|---|---|---|---|
| 6,292,215 B1* | 9/2001 | Vincent | 348/169 |
| 6,375,572 B1 | 4/2002 | Masuyama et al. | |
| 6,509,973 B2 | 1/2003 | Kiyoi et al. | |
| 6,609,797 B2 | 8/2003 | Ejiri et al. | |
| 6,646,251 B1 | 11/2003 | Okamoto | |
| 6,710,713 B1* | 3/2004 | Russo | 340/573.1 |
| 6,952,003 B2 | 10/2005 | Skurnik et al. | |
| 7,002,551 B2 | 2/2006 | Azuma et al. | |
| 7,071,970 B2 | 7/2006 | Benton | |
| 7,075,661 B2 | 7/2006 | Petty et al. | |
| 7,158,118 B2 | 1/2007 | Liberty | |
| 7,191,089 B2* | 3/2007 | Clifford et al. | 702/141 |
| 7,239,301 B2 | 7/2007 | Liberty et al. | |
| 7,262,760 B2 | 8/2007 | Liberty | |
| 7,414,611 B2 | 8/2008 | Liberty | |
| 7,421,369 B2 | 9/2008 | Clarkson | |
| 7,451,633 B2* | 11/2008 | Bang et al. | 73/1.38 |
| 7,489,298 B2 | 2/2009 | Liberty et al. | |
| 7,489,299 B2 | 2/2009 | Liberty et al. | |
| 7,653,214 B2* | 1/2010 | Schroeder et al. | 382/103 |
| 7,729,515 B2 | 6/2010 | Mandella et al. | |
| 2002/0036779 A1 | 3/2002 | Kiyoi et al. | |
| 2002/0085097 A1 | 7/2002 | Colmenarez et al. | |
| 2002/0131052 A1 | 9/2002 | Emery et al. | |
| 2002/0131056 A1 | 9/2002 | Fujii et al. | |
| 2002/0181802 A1 | 12/2002 | Peterson | |
| 2002/0194914 A1* | 12/2002 | Foxlin et al. | 73/514.01 |
| 2003/0158699 A1* | 8/2003 | Townsend et al. | 702/151 |
| 2003/0233870 A1 | 12/2003 | Mancevski | |
| 2004/0201756 A1 | 10/2004 | VanBree | |
| 2004/0212589 A1 | 10/2004 | Hall et al. | |
| 2004/0233461 A1 | 11/2004 | Armstrong et al. | |
| 2004/0252102 A1 | 12/2004 | Wilson et al. | |
| 2005/0088419 A1 | 4/2005 | Lapstun et al. | |
| 2005/0213082 A1 | 9/2005 | DiBernardo et al. | |
| 2005/0261073 A1 | 11/2005 | Farrington, Jr. et al. | |
| 2006/0033713 A1 | 2/2006 | Pryor | |
| 2006/0036947 A1 | 2/2006 | Jelley et al. | |
| 2006/0047427 A1* | 3/2006 | Weed et al. | 701/220 |
| 2006/0161377 A1* | 7/2006 | Rakkola et al. | 702/141 |
| 2006/0206250 A1* | 9/2006 | Darvish | 701/45 |
| 2006/0252475 A1* | 11/2006 | Zalewski et al. | 463/1 |
| 2006/0274032 A1 | 12/2006 | Mao et al. | |
| 2006/0284979 A1* | 12/2006 | Clarkson | 348/143 |
| 2006/0287084 A1* | 12/2006 | Mao et al. | 463/37 |
| 2007/0061077 A1* | 3/2007 | Fateh | 701/220 |
| 2007/0081695 A1 | 4/2007 | Foxlin et al. | |
| 2007/0211050 A1 | 9/2007 | Ohta | |
| 2008/0002031 A1* | 1/2008 | Cana et al. | 348/208.14 |
| 2008/0009348 A1 | 1/2008 | Zalweski et al. | |
| 2008/0030578 A1 | 2/2008 | Razzaque et al. | |
| 2008/0061949 A1 | 3/2008 | Ferguson et al. | |
| 2008/0080789 A1 | 4/2008 | Marks et al. | |
| 2008/0143675 A1 | 6/2008 | Hsieh et al. | |
| 2008/0219509 A1* | 9/2008 | White et al. | 382/107 |
| 2008/0232644 A1* | 9/2008 | Yamashita | 382/103 |
| 2009/0009471 A1 | 1/2009 | Yamamoto et al. | |
| 2010/0013860 A1 | 1/2010 | Mandella et al. | |
| 2010/0105475 A1 | 4/2010 | Mikhailov et al. | |
| 2010/0134614 A1* | 6/2010 | Aman | 348/135 |
| 2011/0163950 A1* | 7/2011 | Ye et al. | 345/157 |
| 2012/0120030 A1 | 5/2012 | McCarthy et al. | |

FOREIGN PATENT DOCUMENTS

| | | |
|---|---|---|
| EP | 2359606 | 8/2011 |
| GB | 2 345 538 A | 7/2000 |
| GB | 2 388 418 A | 11/2003 |
| JP | 2006126148 | 5/2006 |
| KR | 100643304 | 11/2006 |
| KR | 1020070032062 | 3/2007 |
| WO | WO-0180736 | 11/2001 |
| WO | WO 02/27453 A2 | 4/2002 |
| WO | WO 2008/056180 | 5/2008 |

OTHER PUBLICATIONS

Bolt, R.A., "Put-that-there: voice and gesture at the graphics interface", Computer Graphics, vol. 14, No. 3 (ACM Siggraph Conference Proceedings) Jul. 1980, pp. 262.

DeWitt, Thomas and Edelstein, Phil, "Pantomation: A System for Position Tracking," Proceedings of the 2nd Symposium on Small Computers in the Arts, Oct. 1982, pp. 61-69.

Dietrich, Frank, "Real Time Animation Techniques with Microcomputers" 1982, pp. 71-74.

Ziegler, Chris, http://www.endadget.com/2011/03/01/tobii-and-lenovo-show-off-prototype-eye-controlled-laptop-we-go/#disqus thread, "Tobii and Lenovo show off prototype eye-controlled laptop, we do eyes-on" by Chris Ziegler posted on Mar. 1, 2011, 4 pages.

International Preliminary Report on Patentability for International Patent Application No. PCT/US2009/055779, Mailed Jun. 20, 2011, 9 pages.

International Preliminary Report on Patentability and Written Opinion for International Patent Application No. PCT/US2009/050312, Mailed Jun. 30, 2011, 6 pages.

PCT International Search Report and Written Opinion for International Application No. PCT/US09/55779, mailed Oct. 19, 2009, 11 pages.

PCT International Search Report and Written Opinion for International Application No. PCT/US10/36697, mailed Aug. 17, 2010, 8 pages.

Non-Final Office Action for Chinese Patent Application No. 200980150534, Mailed Apr. 23, 2013 20 pages.

Non-Final Office Action for U.S. Appl. No. 13/084,895, Mailed May 8, 2013, 33 pages.

Final Office Action for U.S. Appl. No. 12/789,356, Mailed Mar. 22, 2013, 24 pages.

Non-Final Office Action for Korean. Patent Application No. 10-2011-7016814, Mailed Feb. 28, 2013, 184 pages.

Non-Final Office Action for Japanese Patent Application No, 2011-542152, Mailed Apr. 2, 2013.

Notice of Preliminary Rejection for Korean Patent Application No. 10-2011-701666, Mailed Jan. 30, 2013.

Bolt, Richard A., "Put-That_There: Vioce and Gesture at the Graphics interface", Architecture Machine Group, Massachusetts Institute of Technology, Cambridge Massachusetts, ACM 0-89791-021-4/80/0700-262, 1980.

Dewitt, et al., "Pantomation: A System for Position Tracking, Proceedings of the 2nd Symposium on Small Computers in the Arts", (Oct. 1982), 61-69.

Dietrich, "Real Time Animation Techniques with Microcomputers", (1982), 71-74.

Non-Final Office Action for U.S. Appl. No. 12/435,285, Mailed Sep. 27, 2011, 21 pages.

International Preliminary Report on Patentability for International Patent Application No. PCT/US2010/036697, Mailed Dec. 15, 2011, 6 pages.

International Search Report and Written Opinion for International Patent Application No. PCT/US2012/30478, Mailed Jul. 24, 2012, 13 pages.

Notice of Allowance for U.S. Appl. No. 12/435,285, Mailed Apr. 11, 2012, 3 pages.

Non-Final Office Action for U.S. Appl. No. 12/789,358, Mailed Oct. 1, 2012, 31 pages.

International Search Report and Written Opinion for International Patent Application No. PCT/US20009/55779, Mailed Oct. 19, 2009, 13 pages.

International Search Report and Written Opinion for International Patent Application No. PCT/US2009/50312, Mailed Nov. 10, 2009, 7 pages.

European Supplemental Search Report for European Patent Application No. 09833784.3, Mailed Sep. 27, 2012.

Extended European Search Report for European Patent Application No. 09833780.1, Mailed Oct. 23, 2012.

Extended Europan Search Report for European Patent Application No. 10783873.2, Mailed Dec. 5, 2012.

(56) References Cited

OTHER PUBLICATIONS

Office Action for U.S. Appl. No. 12/789,358 (Oct. 1, 2012), Whole Document.

Kim, Anthony, et al., "Initial Calibration of an Inertial Measurement Unit Using an Optical Position Tracking System", *Position Location and Navigation Syposium*, 2004, Plans 2004 Monterey, CA, USA, Apr. 26-29, 2004, Piscataway, NJ, USA, IEEE, US, Apr. 26, 2004, pp. 96-101, XP010768741.

Neumann, Ulrich, et al., "Augmented Reality Tracking in Natural Environments", *Proceedings of International Symposium on Mixed Reality (ISMR), Merging Real and Virtual Worlds*. Jan. 1, 1999. pp. 101-130, XP001118695.

You, Suya, et al., "Hybrid Inertial and Vision Tracking for Augmented Reality Registration",*Proceedings IEEE 1999 Virtual Reality*. Houston, TX, Mar. 13-17, 1999; [*Proceedings IEEE 1999 Virtual Reality*. (VR)], New York, NY Mar. 13, 1999, pp. 260-267, XP000887668.

Non-Final Office Action for Japanese Patent Application No. 2012-514022, Mailed Jul. 16, 2013, 6 pages.

Non-Final Office Action for Japanese Patent Application No. 2011-542148, Mailed Aug. 27, 2013, 4 pages.

Non-Final Office Action for U.S. Appl. No. 12/789,358, Mailed Jun. 5, 2013, 28 pages.

* cited by examiner

TRACKING SYSTEM CALIBRATION BY RECONCILING INERTIAL DATA WITH COMPUTED ACCELERATION OF A TRACKED OBJECT IN THE THREE-DIMENSIONAL COORDINATE SYSTEM

RELATED APPLICATIONS

This application is related to and claims the benefit of U.S. Provisional Patent application Ser. No. 61/138,499 filed Dec. 17, 2008, which is hereby incorporated by reference.

This application is related to co-pending U.S. patent application Ser. No. 12/435,285, entitled, "CORRECTING ANGLE ERROR IN A TRACKING SYSTEM", filed on May 4, 2009.

FIELD OF THE INVENTION

The present invention relates generally to calibrating a tracking system, and more particularly to calibrating a tracking system that is used to track the location of an object based on positional data of the object and additional received or known data pertaining to the object.

DESCRIPTION OF THE RELATED ART

A growing trend in the computer gaming industry is to develop games that increase the interaction between a user and a gaming system. One way of accomplishing a richer interactive experience is to use game controllers whose movement is tracked by the gaming system in order to track the player's movements and use these movements as inputs for the game. Generally speaking, gesture input refers to having an electronic device such as a computing system, video game console, smart appliance, etc., react to some gesture captured by a video camera or other positional sensor that tracks an object.

In order to produce reliable measurements of the location and motion of the user, the gaming system needs to be calibrated. Such calibration is commonly necessary each time the gaming system is used. In conventional systems, calibrating the gaming system requires a controlled, precise process in which a user measures properties such as the tilt of the video camera, the distance from the user to the video camera, etc. Conventional gaming systems are not able to perform calibration without such a controlled and precise process.

BRIEF DESCRIPTION OF THE DRAWINGS

The invention may best be understood by reference to the following description taken in conjunction with the accompanying drawings in which.

DETAILED DESCRIPTION

Figure 1:
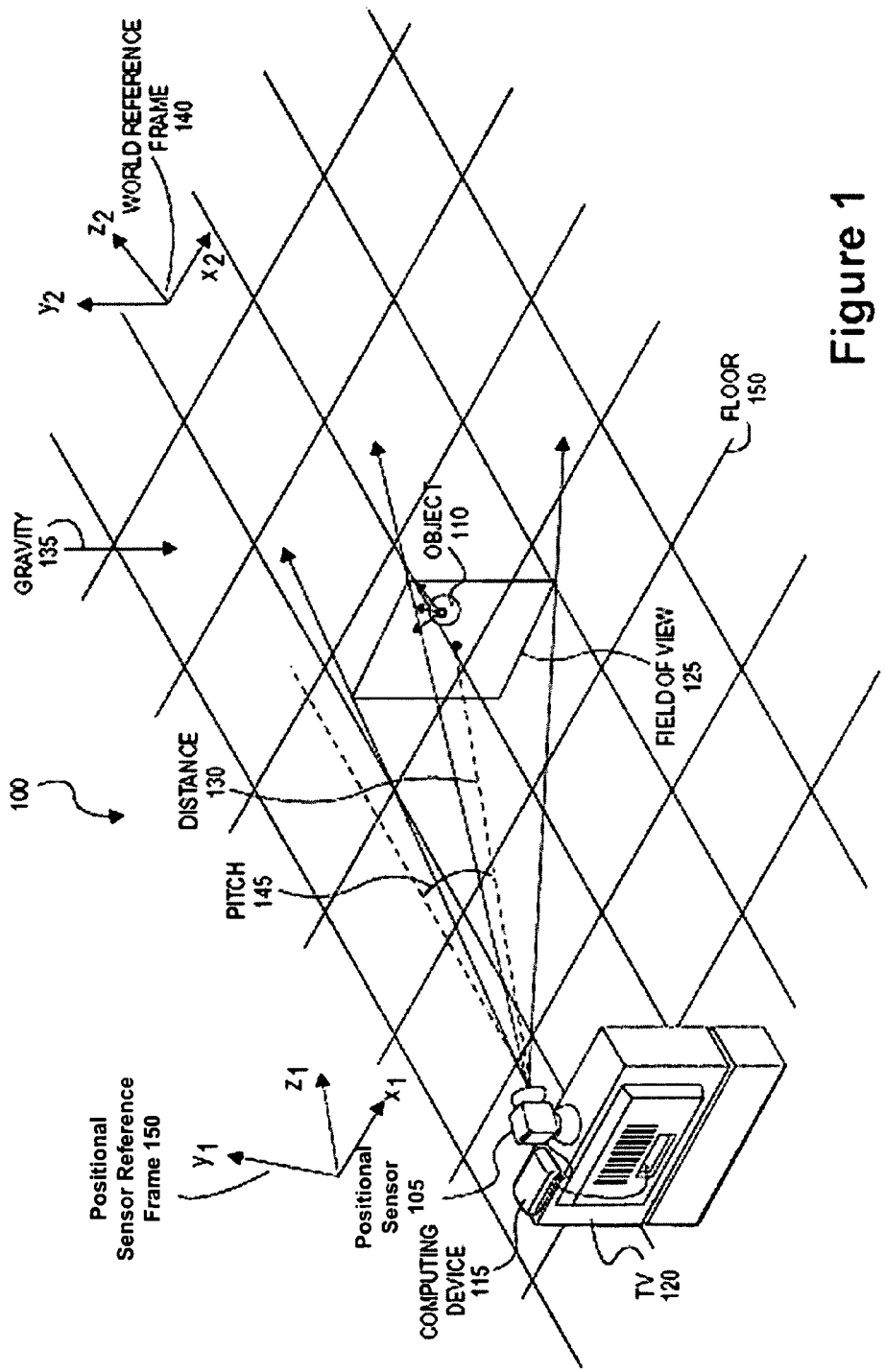
FIG. 1 illustrates a perspective view of a tracking system, in accordance with one embodiment of the present invention.

Described herein is a method and apparatus for calibrating a tracking system for use in a gaming system. In one embodiment, to calibrate the tracking system, positional data (e.g., image locations and image sizes) of a tracked object are received by a positional sensor as the tracked object is moved through a rich motion path. Additionally, inertial data is received that corresponds to the tracked object as the tracked object is moved through the rich motion path. The positional data is converted to a three-dimensional coordinate system of the positional sensor. In one embodiment, image locations are converted to the three-dimensional coordinate system based on the corresponding image sizes and a field of view of the positional sensor. The field of view of the positional sensor may or may not be known. An acceleration of the tracked object is computed in the three-dimensional coordinate system of the positional sensor. The inertial data is then reconciled with the computed acceleration, calibrating the tracking system. Reconciling the inertial data with the computed acceleration may include computing a pitch of the positional sensor and computing a relative yaw between the positional sensor and the tracked object. Reconciling the inertial data with the computed acceleration may also include computing the field of view of the positional sensor.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "converting", "reconciling", "determining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. In one embodiment, the apparatus for performing the operations herein includes a game console (e.g., a Sony Playstation®, a Nintendo Wii®, a Microsoft Xbox®, etc.). A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, or any type of media suitable for storing electronic instructions.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1 illustrates a perspective view of a tracking system 100, in accordance with one embodiment of the present invention. The tracking system 100 includes a positional sensor 105, an object 110 that is tracked by the positional sensor 105, and a computing device 115 that processes data received by the positional sensor 105 and by the object 110. In one embodiment, the tracking system 100 is a component of a gaming system. Alternatively, the tracking system 100 may be a component of a motion capture system.

The positional sensor 105 is a sensor that measures positions of the object 110 in two-dimensional or three-dimensional space relative to the positional sensor 105. Positional data (e.g., images) taken by the positional sensor 105 are in a reference frame 150 of the positional sensor 105 that can be defined by an image plane and a vector normal to the image plane. A reference frame is defined herein as a coordinate system within which to measure an object's position, orientation and other properties. The terms reference frame and coordinate system are used interchangeably throughout this application.

As shown, the positional sensor 105 is positioned on top of a television set 120, with a negative pitch 145 relative to a floor 150. The pitch 145 is an angle between a horizontal axis of the positional sensor's reference frame 150 that is in the image plane of the positional sensor 105 and a plane perpendicular to gravity 135. As long as the pitch 145 is a non-zero value, the positional sensor 105 has a reference frame 150 that is different from a world reference frame 140 (defined as a reference frame that has an axis (e.g., $y_2$) aligned with gravity 135).

In one embodiment, the positional sensor 105 is a standard video camera. In such an embodiment, the positional sensor 105 may capture depth information (distance 130 between the positional sensor 105 and the object 110) based on predefined information that identifies a size of the object 110 and/or based on predefined information that identifies a field of view (FOV) 125 of the positional sensor 105. The field of view 125 is the angular extent of a given scene imaged by the positional sensor 105. The field of view defines the distortion (e.g., amount of zoom) of an image caused by a camera lens. As the object 110 is moved further from the positional sensor 105 (that is, as the distance 130 is increased), an image of the object 110 as captured by the positional sensor 105 becomes smaller. Therefore, the distance 130 of the object 110 to the positional sensor 105 can be determined based on a ratio of the image size of the tracked object 110 (e.g., as measured in pixels) to a known actual size of the tracked object 110 provided that a field of view 125 of the positional sensor 105 is known. If either the field of view 125 or the size of the object 110 is unknown, the unknown value may be solved, for example, as described below with reference to FIG. 9.

In another embodiment, the positional sensor 105 is a Z-camera (a single lens video camera capable of capturing video with depth information) or a stereo camera (video camera with 2 or more lenses that can capture three-dimensional images). In such an embodiment, the positional sensor 105 can capture depth information without being pre-configured with information identifying a size of the object 110.

In yet another embodiment, the positional sensor 105 is a sensor array such as an ultrasonic sensor array or a photonic detector. Such a positional sensor 105 detects the distance between the positional sensor 105 and the object 110 using time of flight or phase coherence (e.g., of light or sound), and detects vertical and horizontal positions of the object 110 using triangulation.

Figure 2A:
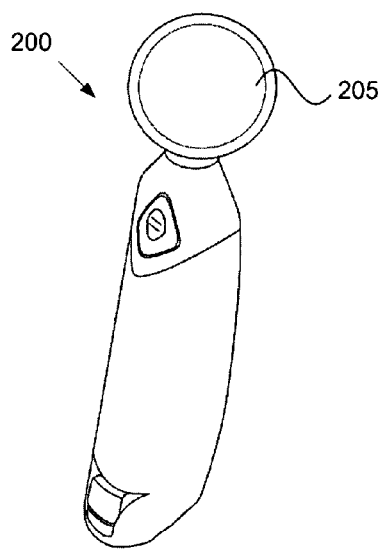
FIG. 2A illustrates a game controller having a ball section, in accordance with one embodiment of the present invention.
Figure 2B:
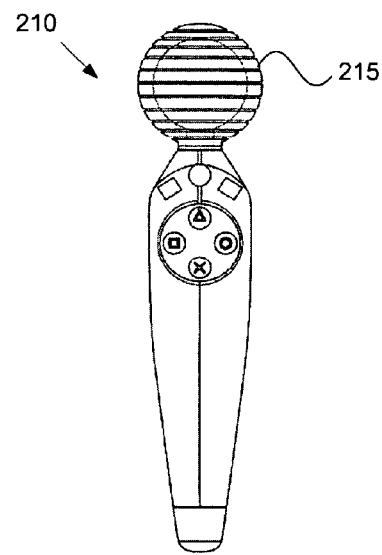
FIG. 2B illustrates another game controller having a ball section, in accordance with another embodiment of the present invention.
Figure 2C:
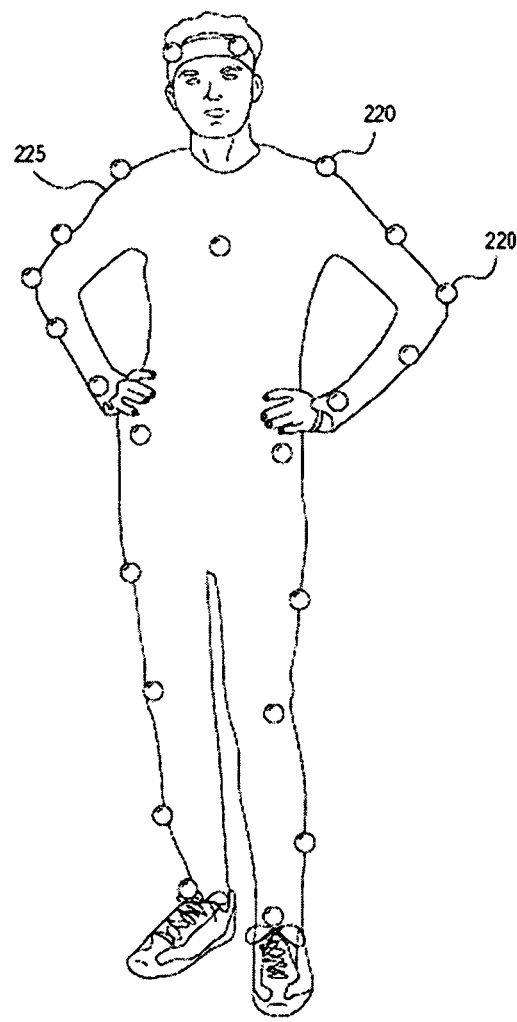
FIG. 2C illustrates multiple motion capture balls disposed on a user, in accordance with one embodiment of the present invention.

The object 110 is an electronic device that includes or is connected with one or more inertial sensors. The inertial sensors may measure accelerations along a single axis or multiple axes, and may measure linear as well as angular accelerations. In one embodiment, the object 110 is a hand held electronic device or a portion of a handheld electronic device such as a game controller, as shown in FIGS. 2A and 2B. In another embodiment, the object 110 is a motion capture (mocap) ball, as shown in FIG. 2C. The object 110 may have an arbitrary shape, such as a square, sphere, triangle, or more complicated shape. In one embodiment, the object 110 has a spherical shape.

FIG. 2A illustrates a game controller 200 having a ball section 205, in accordance with one embodiment of the present invention. FIG. 2B illustrates another game controller 210 having a ball section 215, in accordance with another embodiment of the present invention. In certain embodiments, the ball sections 205 and 215 correspond to object 110 of FIG. 1.

The ball sections 205, 215 can be of different colors, and in one embodiment, the ball sections 205, 215 can light up. Although a spherical ball section is illustrated, the ball sections 205, 215 can have other shapes for visual tracking purposes, such as a partial sphere, an imperfect sphere, an elongated ball (like one used in American football or in rugby), a cube-like shape, etc. In one embodiment, the ball section 205, 215 is 4 cm. in diameter. However, other larger or smaller sizes are also possible. Larger sizes help with visual recognition. For example, a ball with a 5 cm. diameter can provide about 55 percent more pixels for image recognition than a 4 cm. ball.

FIG. 2C illustrates multiple mocap balls 220 disposed on a user 225, in accordance with one embodiment of the present invention. Mocap balls 220 are markers that are worn by a user 225 near each joint to enable a positional sensor to capture and identify the user's motion based on the positions or angles between the mocap balls 220. In one embodiment, the mocap balls 220 are attached to a motion capture suit.

Returning to FIG. 1, object 110 and positional sensor 105 are connected with computing device 115 through wired and/or wireless connections. Examples of wired connections include connections made via an IEEE 1394 (firewire) cable, an ethernet cable, and a universal serial bus (USB) cable, etc. Examples of wireless connections include wireless fidelity (WiFi™) connections, Bluetooth® connections, Zigbee® connections, and so on. In the illustrated embodiment, object 110 is wirelessly connected with computing device 115 and positional sensor 105 is connected with computing device 115 via a wired connection.

Computing device 115 may be a video game console, a personal computer, a game kiosk, or other computing apparatus. Computing device 115 may execute games or other applications that can respond to user input from object 110. The object 110 is tracked, and motion of the object 110 provides the user input.

Before the tracking system 100 can accurately track the object 110, the tracking system 100 needs to be calibrated. Calibrating the tracking system 100 includes computing a pitch 145 of the positional sensor 105 and computing a relative yaw between the positional sensor 105 and the object 110. The relative yaw between the object 110 and the positional sensor 105 represents the differences in heading between the object 110 and the positional sensor 105. In one embodiment, zero yaw is defined as being achieved between the positional sensor 105 and the object 110 when the object is pointed perpendicular to an imaging plane of the positional sensor 105. Alternatively, zero yaw may be defined as being achieved when the object 110 is pointed directly toward the positional sensor 105. If the positional sensor 105 is a camera with an unknown field of view 125, calibrating the tracking system 100 also includes computing the field of view 125 of the positional sensor 105. If the object 110 has an unknown size, calibrating the tracking system 100 may also include determining the size of the object 110.

In order for the inertial sensor disposed in the object 110 to gather sufficient inertial data for calibration, the object 110 should be moved by a user. The object 110 should be moved within the frame of view 125 of the positional sensor 105 to ensure that each inertial data measurement has a corresponding positional data measurement (e.g., a corresponding image size and image location measurement). An effectiveness of the calibration can be increased if the object 110 is moved through a rich motion path within the field of view 125 of the positional sensor 105. A rich motion path is defined herein as a motion that exceeds a minimum acceleration threshold and that occurs in at least two dimensions (e.g., in a plane). In one embodiment, a rich motion path includes movement towards and/or away from the positional sensor 105. A rich motion path that includes acceleration in three dimensions in one embodiment is preferable over a rich motion path that includes acceleration in only two dimensions.

Received inertial data has an uncertainty that is defined by an amount of signal noise that accompanies the inertial data. As the magnitude of accelerations measured by the object 110 decreases, a signal to noise ratio (ratio of a signal power to the noise power corrupting the signal) increases. A decrease in the signal to noise ratio causes the inertial data to become less accurate. In one embodiment, the minimum acceleration threshold is set to prevent the inertial data from falling below a minimum signal to noise ratio.

Figure 3:
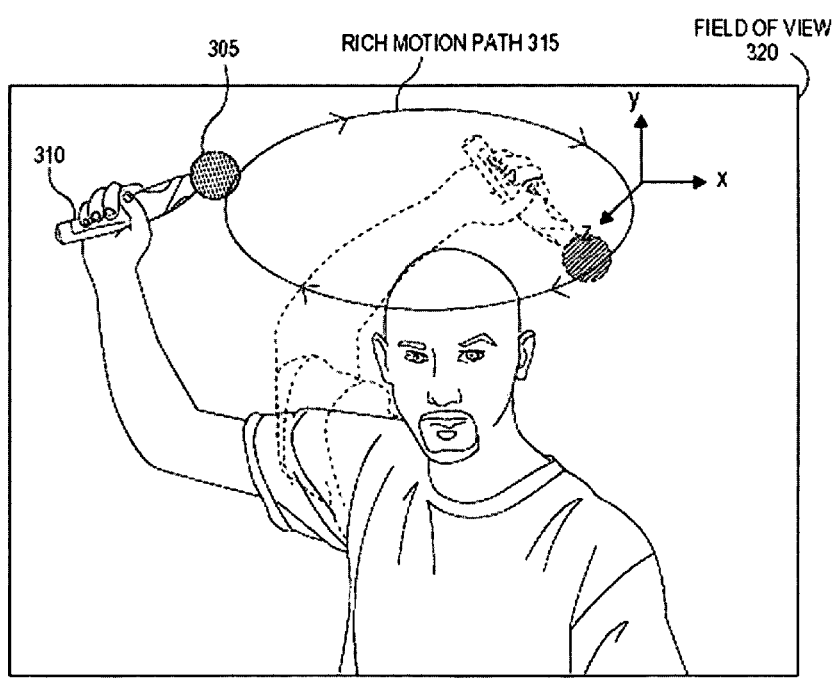
FIG. 3 illustrates an example of an object being moved through a rich motion path, in accordance with one embodiment of the present invention.

An example of an object being moved through a rich motion path in accordance with one embodiment of the present invention is illustrated in FIG. 3. As shown, the object is a ball 305 attached to the end of a game controller 310 and the rich motion path 315 is a circular path about a user's head. Circular paths are advantageous in that movement in a circle provides constant acceleration. Therefore, a circular path provides increased inertial data. The entire rich motion path 315 occurs within a field of view 320 of a positional sensor, and includes motion toward and away from the positional sensor.

Figure 4:
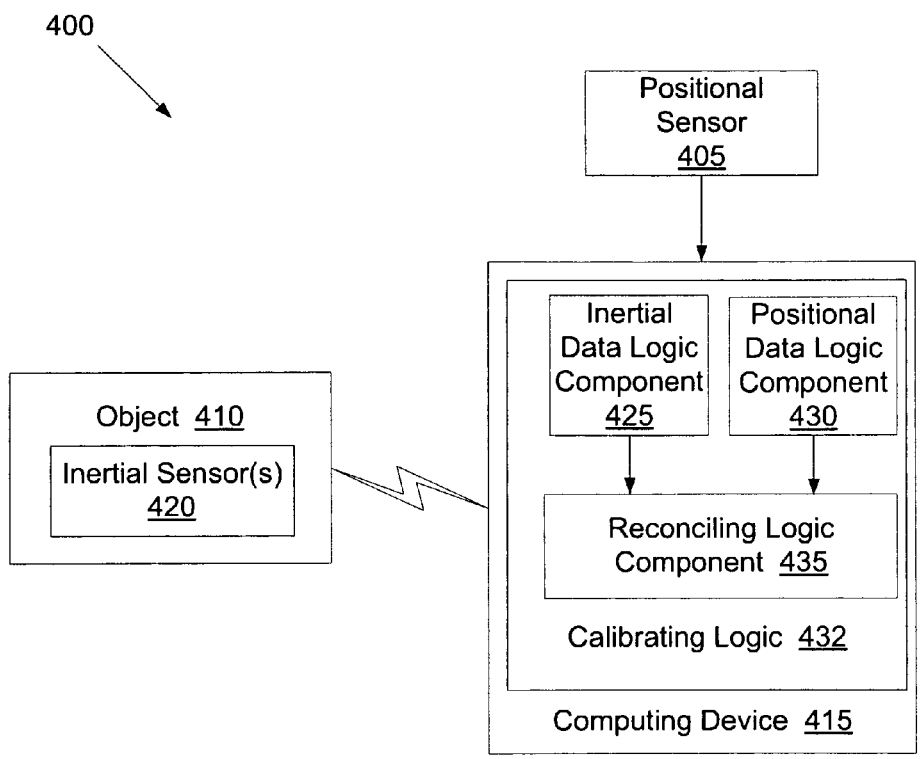
FIG. 4 illustrates a block diagram of a tracking system, in accordance with one embodiment of the present invention.

FIG. 4 illustrates a block diagram of a tracking system 400, in accordance with one embodiment of the present invention. The tracking system 400 includes a computing device 415 physically connected with a positional sensor 405 and wirelessly connected with an object 410 that is tracked by the positional sensor 405. It should be noted that the computing device 415 may be wirelessly connected with the positional sensor 405 and/or physically connected with the object 410. In one embodiment, the tracking system 400 corresponds to tracking system 100 of FIG. 1.

The object 410 includes one or more inertial sensors 420 that have a fixed position in the object 410. In one embodiment, the inertial sensors 420 include one or more gyroscopes and one or more accelerometers. Gyroscopes use principals of angular momentum to detect changes in orientation (e.g., changes in pitch, roll and twist). Accelerometers measure accelerations along one or more axes. The gyroscope and accelerometer may be separate sensors, or may be combined into a single sensor. In one embodiment, the gyroscope and accelerometer are micro-electromechanical systems (MEMS) devices. As the object 410 is moved (e.g., through a rich motion path), the inertial sensors 420 gather inertial data and transmit it to the computing device 415. Inertial data gathered by the inertial sensors 420 is in a reference frame of the object 410.

The positional sensor 405 may be a video camera, a Z-camera, a stereo camera, an ultrasonic sensor array, a photonic detector, or other device capable of capturing an image. As the object 410 is moved (e.g., through a rich motion path), the positional sensor 405 captures positional data (e.g., images) of the object 410 that may include image size and image location information. The positional sensor 405 then transmits the positional data to the computing device 415. In one embodiment, the positional sensor 405 streams the positional data to computing device 415 in real time as the positional data is obtained.

In one embodiment, as the object 410 is tracked by the positional sensor 405, changing positions of the object 410 are used as an input to the computing device 415 to control a game, computer application, etc. For example, changing positions of the object 410 can be used to control a character in a first person or third person perspective game, to move a mouse cursor on a screen, and so on. In another embodiment, the inertial data received from the object 410 is used as an input to the computing device 415. Alternatively, the inertial data may be used in combination with the positional data obtained by the positional sensor 405 to provide a precise and accurate input for the computing device 415.

The computing device 415 may be a video game console, personal computer, game kiosk, etc. In one embodiment, the computing device 415 includes a calibrating logic 432 that calibrates the tracking system 400 based on the positional data obtained from the positional sensor 405 and the inertial data obtained from the object 410. In a further embodiment, the calibrating logic 432 includes an inertial data logic component 425, a positional data logic component 430 and a reconciling logic component 432, each of which performs different operations related to calibration.

Positional data logic component 430 analyses positional data (e.g., images) received from the positional sensor 405, (e.g., to find the object 410 in the images). In one embodiment, an image location of the object 410 is determined by analyzing a pixel group that represents the object 410 in the image to find the object's centroid. In one embodiment, a Gaussian distribution of each pixel can be calculated and used to provide sub-pixel accuracy of the centroid location.

In one embodiment, the positional data logic component 430 converts the image location information to a three dimensional coordinate system of the positional sensor 405. The image locations may be converted to the three dimensional coordinate system using the following equations:

$$X_w = \frac{X_i \cdot Z_w}{f} \quad \text{(equation 1)}$$

$$Y_w = \frac{Y_i \cdot Z_w}{f} \quad \text{(equation 2)}$$

$$Z_w = \frac{f \cdot R}{2r} \quad \text{(equation 3)}$$

where $X_w$ is the horizontal position in the world reference frame, $Y_w$ is the vertical position in the world reference frame, $X_i$ is the horizontal position in the image, $Y_i$ is the vertical position in the image, $Z_w$ is the distance between the positional sensor and the object, f is the focal length of the positional sensor (a value proportional to the field of view), R is the size of the object (e.g., radius of a sphere in mm), and r is the image size of the object (e.g., radius of a projection of the sphere in pixels).

Once the positional data (e.g., image locations) is converted into the three dimensional coordinate system, the positional data logic component 430 takes a second derivative of the location information with respect to time to compute an acceleration of the object 410 in the three dimensional coordinate system of the positional sensor 405 based on changing positions of the centroid over time. The positional data logic component 430 then provides the computed acceleration to the reconciling logic component 435. In one embodiment, the positional data logic component 430 smoothes the positional data (e.g., image locations) before computing the acceleration.

The inertial data logic component 425 processes the inertial data to place it in a condition to be reconciled with the computed acceleration. In one embodiment, the inertial data logic component 425 removes an acceleration caused by gravity from the inertial data, and then passes the inertial data to the reconciling logic component 435.

In one embodiment, the relative differences between the positional sensor's reference frame and the reference frame used for the inertial data need to be unchanging. However, the reference frame of the object 410 changes relative to the reference frame of the positional sensor 405 as the object 410 changes in pitch and roll. Moreover, if the object 410 does not maintain an approximately fixed pitch and roll, then the inertial data includes measurements of accelerations caused by changes in pitch and/or changes in roll. Such accelerations do not reflect changes in position of the object 410, and therefore may not provide useful information for calibration. Such accelerations may also not be calculable based on positional data, and therefore may not be reflected in the computed acceleration that is determined by the positional data logic component 430. This can cause errors in calibration.

In one embodiment, the inertial data logic component 425 leaves the inertial data in the reference frame of the object 410. The inertial data logic component 425 may leave the inertial data in the reference frame of the object 410, for example, if the object maintains an approximately fixed pitch and roll throughout a rich motion path. Additionally, a changing reference frame of the inertial data may not cause significant calibration errors if the changes in pitch and roll cancel out over the rich motion path. If the changes in pitch and roll average to zero, then the errors caused by the changes between the reference frames, and by accelerations due to changes in pitch and roll, can approximately cancel out. This may be achieved, for example, if the rich motion path is a small circular path in front of a user in which the user rotates the object 410 about his elbow, without moving his wrist or shoulder. Under such conditions, the inertial data logic component 425 may leave the inertial data in a reference frame of the object 410.

In one embodiment, inertial data logic component 425 processes the inertial data to convert the inertial data from a reference frame of the object 410 to a world reference frame (reference frame having an axis aligned with gravity). Gravity asserts a constant downward force that can be measured by the inertial sensor 420. Based on the downward force of gravity detected by the inertial sensor 420, inertial data can be converted to the world reference frame by calculating a pitch and roll of the object 410 relative to the world reference frame. As the object 410 is moved, a gyroscope can be used to determine angular accelerations, and thus to determine changes in pitch and roll of the object 410 relative to an initial pitch and roll that were measured when the object 410 was at rest. Therefore, as the object 410 is moved, inertial data can be converted to the world reference frame. This corrects errors that would otherwise be introduced by the changing relationship between the reference frames.

In one embodiment, the inertial sensor 420 is not located at a center of the object 410. Therefore, since the accelerations measured by the positional sensor 405 are based on the centroid of the object 410, the inertial sensor 420 does not measure the same acceleration as the positional data logic component 430 computes based on positional data. For example, if the object 410 is whipped around in an arc, the positional sensor 405 may observe a larger acceleration than is recorded by the inertial sensor 420. This discrepancy is due to the inertial sensor 420 being closer than the center of the object 410 to the arc's center.

The discrepancy caused by the displacement between the inertial sensor 420 and the center of the object 410 can be removed if the displacement is known. A rotation rate (measured as centripetal force) can be measured by a gyroscope, and used in conjunction with the displacement to calculate what acceleration would be observed by an inertial sensor 420 located at the center of the object 410. In one embodiment, it is this acceleration that is passed on to the reconciling logic component 435.

The reconciling logic component 435 reconciles the computed acceleration from the positional data logic component 430 with the inertial data from the inertial data logic component 425 to calibrate the tracking system 400.

Reconciling the inertial data with the computed acceleration includes calculating a pitch of the positional sensor 405 and a relative yaw between the positional sensor 405 and the tracked object 410. Solving for the pitch of the positional sensor 405 provides a rotation angle that would cause the positional sensor to be aligned perpendicular to gravity. Regarding yaw, the object 410 initially has an unknown heading. Therefore, an initial heading of the object 410 is arbitrarily chosen as a heading of zero. The angle between the initial zero heading of the object 410 and a heading of the positional sensor 405 (yaw) is calculated. The zero heading of the object 410 can then be modified so that it is aligned with the heading of the positional sensor 405. The tracking system 400 can then detect the direction in which the object 410 is pointed by monitoring the displacement of the object 410 from the zero heading using, for example, a gyroscope disposed within the object 410.

The inertial data can be represented as a first set of vectors, and the computed acceleration can be represented as a second set of vectors. The computed acceleration and the inertial data represent different measurements of the same object motion. Therefore, the computed acceleration and the inertial data include a matched set of vectors, in which each vector in the first set of vectors corresponds to a vector in the second set of vectors. Corresponding vectors have the same origin and the same magnitude. The only difference between the two sets of vectors is the frame of reference that they were measured in. Accordingly, the inertial data can be reconciled with the computed acceleration by finding the rotations in space necessary to align the frames of reference. In one embodiment, in which a field of view of the positional sensor 405 is unknown, a scaling transformation is also performed to reconcile the inertial data with the computed acceleration.

In one embodiment, the pitch and yaw are solved for by rotating vectors of one of the sets of vectors by multiple potential first angles (representing pitch) and by multiple potential second angles (representing yaw). Many different combinations of potential first angles and potential second angles may be tried. The combination of a potential first angle and a potential second angle that yields the smallest difference between the rotated vectors of the first set of vectors and the corresponding vectors of the second set of vectors are the correct first and second angles. A gradient descent technique, partial least squares technique, least squares fit technique, or other error minimization technique may be used to minimize the number of combinations of potential first angles and potential second angles that are tested to find the correct first angle and second angle.

Each vector $V_i$ that comprises object motion is represented in the first set of vectors as $V_{i1}$ and in the second set of vectors as $V_{i2}$. For all vectors $V_{i1}$ in the first set of vectors, the vector $V_{i1}$ is transformed by a three dimensional rotation that is based on the first and second potential angles, ending up with a transformed vector $V_{i1}'$. A difference $D_\theta$ is then found between $V_{i1}'$ and $V_{i2}$ for each vector $V_i$. The differences may then be combined using error minimization techniques. For example the differences for each vector pair may be averaged. In one embodiment, the averaged sum of the differences between the rotated vectors $V_{i1}'$ of the first set of vectors and the matching vectors $V_{i2}$ of the second set of vectors is calculated. In another embodiment, the sum of the squared differences may be computed using, for example, on the following algorithm:

$$D_\theta = \sum_{i=1}^{n} ((V_{i1}' - V_{i2}) \cdot (V_{i1}' - V_{i2})) \quad \text{(equation 4)}$$

Other error minimization techniques may also be used to combine the vector differences.

The angle θ that yields the smallest $D_\theta$ is the correct three dimensional angle. Therefore, the potential first angle and potential second angle that make up the three dimensional angle θ represent the pitch of the positional sensor 405 and the relative yaw between the positional sensor 405 and the object 410. It does not matter which set of vectors is rotated since the angle between the two sets of the vectors is the same regardless of which set is rotated.

In another embodiment, the inertial data is reconciled with the computed acceleration by computing a three dimensional rotation that aligns the coordinate systems. A three dimensional rotation can be defined by an axis and an angle. The rotation axis ê for the three dimensional rotation can be solved for by taking the cross product of vectors of the first set of vectors $V_{i1}$ with vectors of the second set of vectors $V_{i2}$, as follows:

$$\hat{e} = V_{i1} \times V_{i2} \quad \text{(equation 5)}$$

The dot product of $V_{i1}$ and $V_{i2}$ can also be taken to find a scaler s that represents the projection of $V_{i1}$ onto $V_{i2}$, as follows:

$$s = V_{i1} \cdot V_{i2} \quad \text{(equation 6)}$$

The angle of the three dimensional rotation θ can then be solved for using the rotation axis and the scalar as follows:

$$\theta = \arctan\frac{\hat{e}}{r} = \arctan\frac{V_{i1} \times V_{i2}}{V_{i1} \cdot V_{i2}} \quad \text{(equation 7)}$$

The three dimensional rotation may then be decomposed into either of the reference frames to determine the angles of rotation about each of the axes of that reference frame. For example, the three dimensional rotation can be projected onto the yz plane (plane that the x-axis is normal to) to determine the amount of rotation that is occurring about the x-axis, and can be projected onto the xz plane (plane that the y-axis is normal to) to determine the amount of rotation that is occurring about the y-axis. If the three dimensional angle is projected into the world reference frame, the rotation about the axis that is aligned with gravity is the yaw, and the rotation about the axis that is perpendicular to gravity and in the imaging plane of the positional sensor is the pitch. The three dimensional rotation can be decomposed into rotations about the axes of the reference frames using, for example, three orthogonal matrices, a rotation matrix or a quaternion.

Quaternions form a four dimensional normed division algebra over the real numbers. Quaternions provide a useful representation of coordinate transformations because they can be computed faster than matrix transformations, and never lose their orthogonality. A quaternion representation of a rotation is written as a four dimensional vector:

$$q = [q_1 q_2 q_3 q_4]^T \quad \text{(equation 8)}$$

In terms of the world reference frame, the quaternion's elements are expressed as follows:

$$q_1 = \frac{\hat{e}_x \sin\left(\frac{\theta}{2}\right)}{|V_{i1} \times V_{i2}|} \quad \text{(equation 9)}$$

$$q_2 = \frac{\hat{e}_y \sin\left(\frac{\theta}{2}\right)}{|V_{i1} \times V_{i2}|} \quad \text{(equation 10)}$$

$$q_3 = \frac{\hat{e}_z \sin\left(\frac{\theta}{2}\right)}{|V_{i1} \times V_{i2}|} \quad \text{(equation 11)}$$

$$q_4 = \cos\left(\frac{\theta}{2}\right) \quad \text{(equation 12)}$$

Where $\hat{e}_x$, $\hat{e}_y$, and $\hat{e}_z$ represent the unit vectors along the x, y and z axes of the world reference frame, respectively.

The quaternion fully represents both the yaw and pitch rotations that are necessary to align the reference frames. However, to provide a more intuitive result, the quaternion may be converted to Euler angles of pitch, yaw and roll. The roll, pitch and yaw can be computed from the quaternion according to the formulas:

$$\text{yaw} = \arctan\frac{2(q_4 q_2 + q_3 q_1)}{1 - 2(q_1^2 + q_2^2)} \quad \text{(equation 13)}$$

$$\text{pitch} = \arcsin(2(q_4 q_1 - q_2 q_3)) \quad \text{(equation 14)}$$

$$\text{roll} = \arctan\frac{2(q_4 q_3 + q_1 q_2)}{1 - 2(q_3^2 + q_1^2)} \quad \text{(equation 15)}$$

The yaw, pitch and roll angles may be determined for each vector pair. The yaw, pitch and roll angles may then be combined to determine a pitch of the positional sensor and a relative yaw between the positional sensor 405 and the tracked object 410. The yaw, pitch and roll angles may be combined using an average, a weighted average, or other combining function.

In one embodiment, the positional sensor is assumed to have a roll of zero. Therefore, in one embodiment the roll for vector pairs may also be assumed to be zero. However, in certain embodiments noise may introduce a difference between the vectors in a vector pair that indicates a nonzero roll. In such embodiments, roll may not be assumed to be zero, and may instead be calculated as described above. Alternatively, roll may be assumed to be zero, and vector pairs that indicate a nonzero roll may be discarded. In one embodiment, roll is assumed to be zero even in instances where a nonzero roll is indicated. Rather than discarding vector pairs, a difference value may be determined for the vector pairs, wherein the difference is caused by the assumed zero roll. Vector pairs having the smallest difference value may then be used to determine the pitch of the positional sensor and a relative yaw between the positional sensor 405 and the tracked object 410. Other methods of compensating for noise may also be used.

Figure 5:
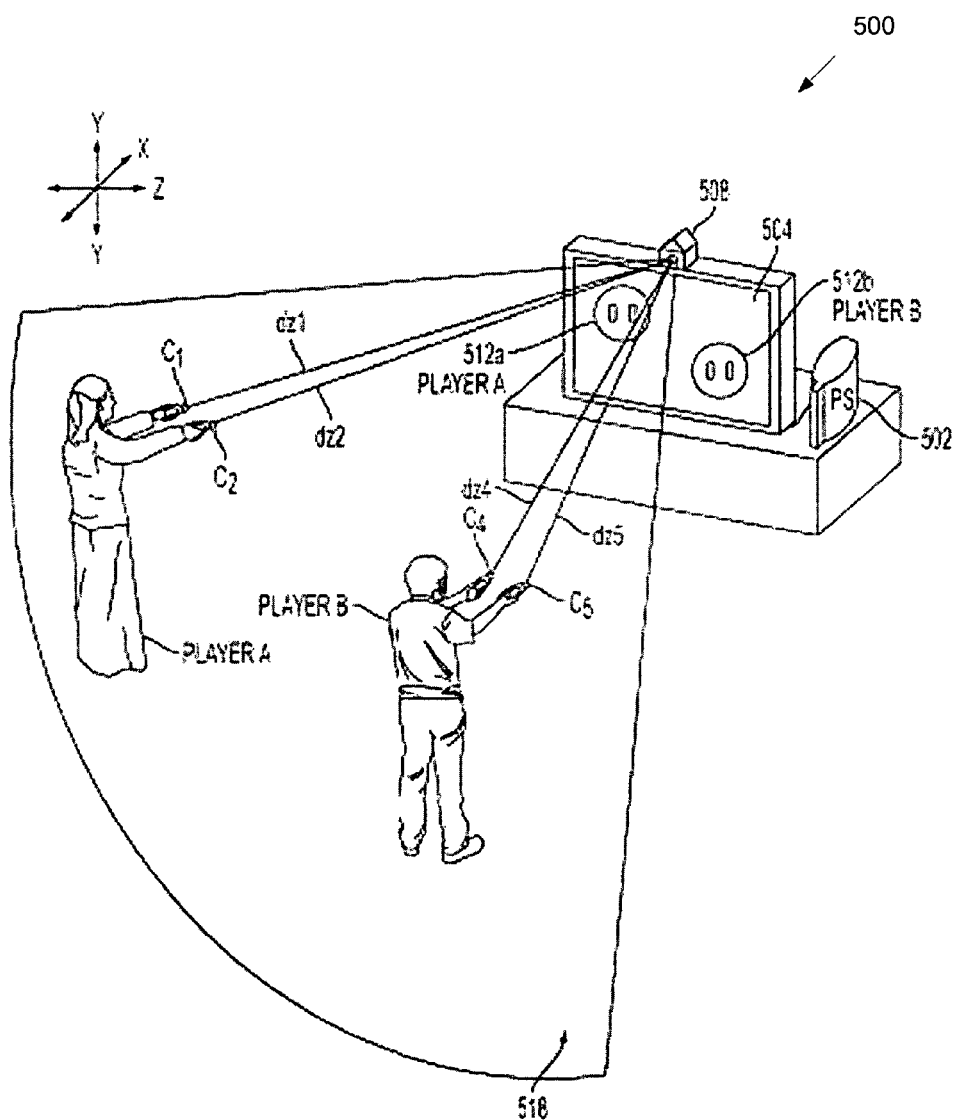
FIG. 5 shows a schematic diagram of a multiplayer environment, according to one embodiment of the present invention.

FIG. 5 shows a schematic diagram of a multiplayer environment 500, in which visual information is used to determine the locations of different controllers held by players, according to one embodiment. In the multiplayer environment 500, positional sensor 508 obtains an image of a playing field 518, and the image is analyzed to obtain the location of ball-attached controllers $C_1$, $C_2$, $C_4$ and $C_5$. Distances $d_{z1}$, $d_{z2}$, $d_{z4}$, and $d_{z5}$ are estimated by analyzing the shape and size of the respective balls in the captured image. A computing device 502 uses the obtained coordinates and distances to produce representations of the players in screen 504, avatars 512a and 512b respectively. A typical distance for good image recognition is about 10 ft (3 mtr). One advantage of using visual recognition is that improvements in image capture and image recognition can be included in the system without having to change the controller.

Figure 6:
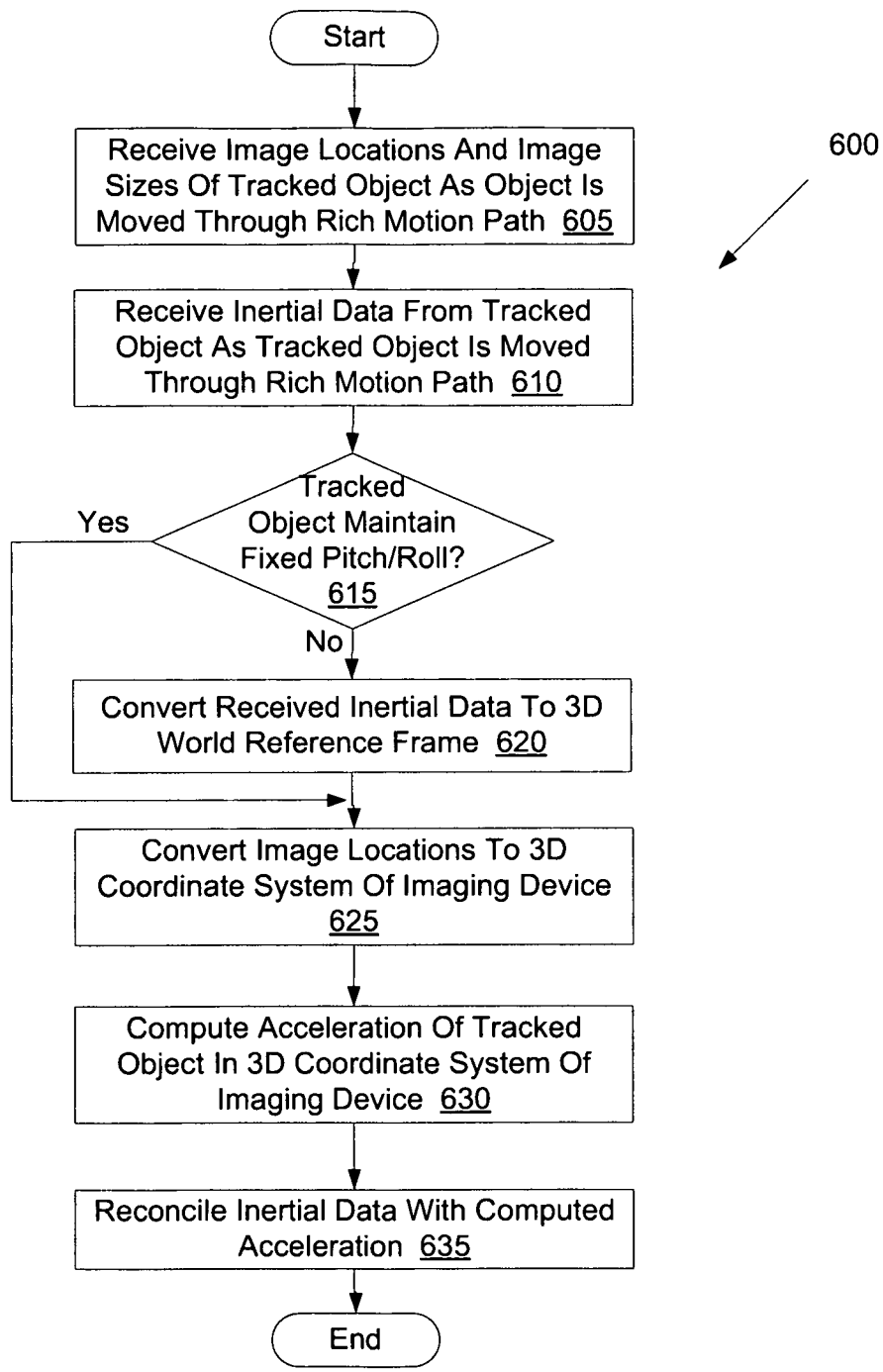
FIG. 6 illustrates a flow diagram of one embodiment for a method of calibrating a tracking system.

FIG. 6 illustrates a flow diagram of one embodiment for a method 600 of calibrating a tracking system. The method may be performed by processing logic that may comprise hardware (e.g., circuitry, dedicated logic, programmable logic, microcode, etc.), software (such as instructions run on a processing device), or a combination thereof. In one embodiment, method 600 is performed by computing device 115 of FIG. 1. In one embodiment, method 600 is performed each time a game or other application is started on computing device 115. Alternatively, method 600 may be performed each time movement of a tracked object is detected after a period of inactivity.

Referring to FIG. 6, at block 605 the computing device receives positional data (e.g., image locations and image sizes) of a tracked object from a positional sensor as the object is moved through a rich motion path. In one embodiment, the computing device receives images of the object in a two-dimensional reference frame of the positional sensor.

At block 610, the computing device receives inertial data from the tracked object as the tracked object is moved through the rich motion path. The received inertial data may be in a reference frame of the tracked object.

In one embodiment, the relative differences between the positional sensor's reference frame and the reference frame used for the inertial data needs to be unchanging. However, the reference frame of the object changes relative to the reference frame of the camera as the object changes in pitch and roll. Therefore, at block 615 the tracking system determines whether the tracked object maintains an approximately fixed pitch and/or roll as the object is moved through the rich motion path. If the tracked object maintains an approximately fixed orientation, then the method proceeds to block 625. However, if the tracked object changes in pitch and/or roll, the method continues to block 620. In one embodiment, if the changes in pitch and roll average to zero, then the errors caused by the changes between the reference frames can approximately cancel out. This may be achieved, for example, if the rich motion path is a circular path. Under such conditions, the method proceeds to block 625.

At block 620 the positional sensor converts the received inertial data to a three dimensional world reference frame. This conversion can be made because an inertial sensor disposed in the tracked object constantly measures a downward force of gravity. At block 625, the image locations are converted to a three dimensional coordinate system of the positional sensor (e.g., from a two dimensional coordinate system of the positional sensor).

At block 630, an acceleration of the tracked object is computed in the three dimensional coordinate system of the positional sensor. A second derivative of the image locations can be taken with respect to time to compute acceleration of the tracked object. In one embodiment, the acceleration is computed in real time as the positional data is received. Alternatively, the acceleration may be computed periodically (e.g., every 10 milliseconds, every half second, etc.), or when the rich motion is completed.

At block 635, the received inertial data is reconciled with the computed acceleration to complete calibration of the positional sensor. Reconciling the inertial data with the computed acceleration includes determining the rotations necessary to align the frames of reference. Determining rotations includes calculating a pitch of the positional sensor and a relative yaw between the positional sensor and the tracked object. In one embodiment, the pitch and yaw are solved for by rotating vectors of one of the sets of vectors by multiple potential first angles and by multiple potential second angles, and selecting a potential first angle and a potential second angle that provide the greatest alignment between the reference frames. In another embodiment, the pitch and yaw are explicitly solved for. The pitch and yaw may be solved for using a rotation matrix, three orthogonal matrices that define Euler angles, a unit quaternion, etc.

Figure 7:
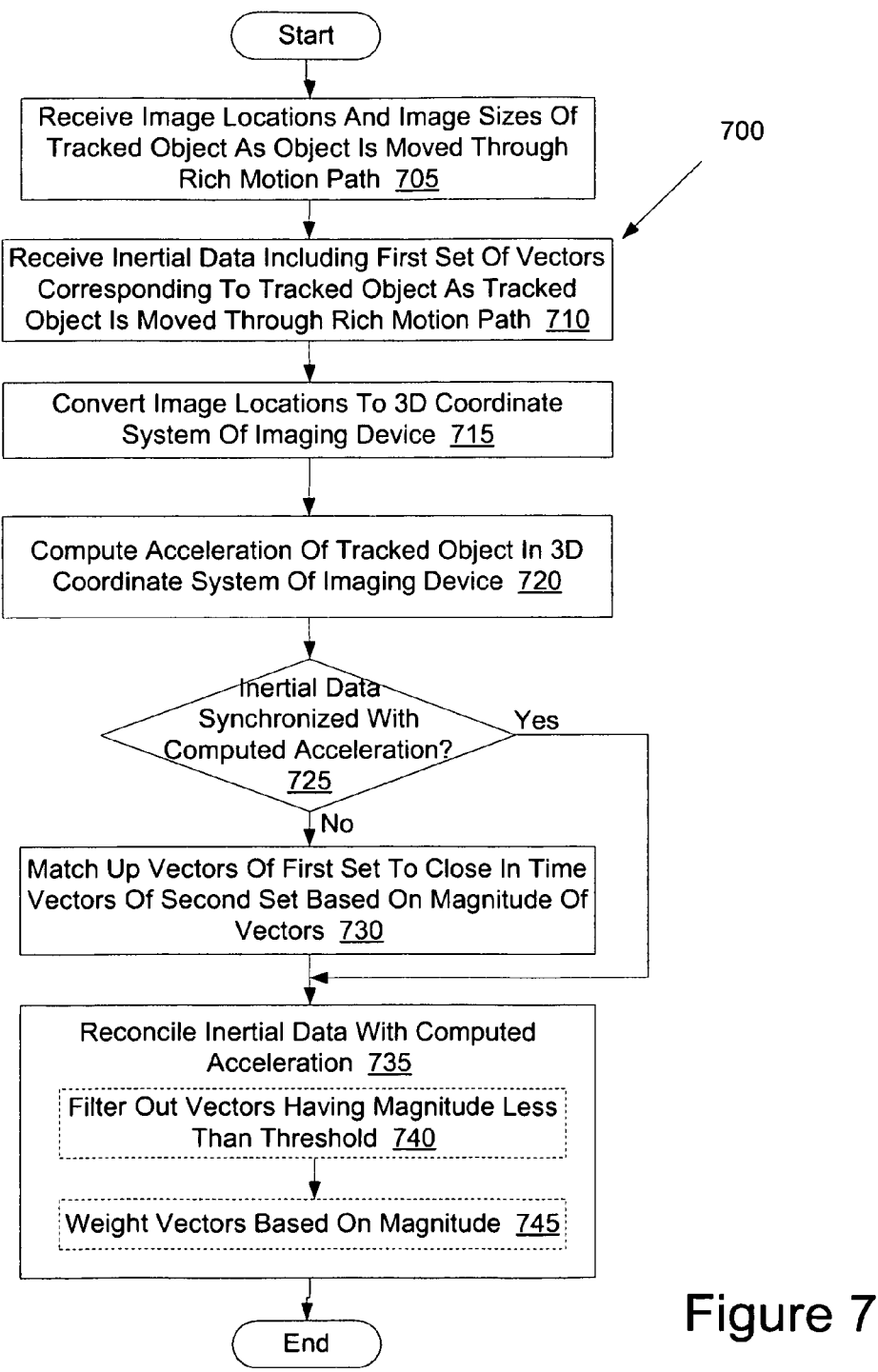
FIG. 7 illustrates a flow diagram of another embodiment for a method of calibrating a tracking system.

FIG. 7 illustrates a flow diagram of another embodiment for a method 700 of calibrating a tracking system. The method may be performed by processing logic that may comprise hardware (e.g., circuitry, dedicated logic, programmable logic, microcode, etc.), software (such as instructions run on a processing device), or a combination thereof. In one embodiment, method 700 is performed by computing device 115 of FIG. 1. In one embodiment, method 700 is performed each time a game or other application is started on computing device 115. Alternatively, method 700 may be performed each time movement of a tracked object is detected after a period of inactivity.

Referring to FIG. 7, at block 705 the computing device receives positional data (e.g., image locations and image sizes) of a tracked object from an positional sensor as the object is moved through a rich motion path. At block 710, the computing device receives inertial data from the tracked object as the tracked object is moved through the rich motion path. The inertial data may in a reference frame of the tracked object or in a world reference frame.

At block 715, the positional data (e.g., image locations) is converted to a three dimensional coordinate system of the positional sensor. At block 720, an acceleration of the tracked object is computed in the three dimensional coordinate system of the positional sensor. A second derivative of the image locations can be taken with respect to time to compute acceleration of the tracked object.

At block 725, the computing device determines whether the inertial data is synchronized with the computed acceleration. Each vector in the computed acceleration corresponds to a vector in the inertial data. However, due to delays in transit time, computation time, etc. a timing may be off between vectors of the inertial data and the corresponding vectors of the computed acceleration. If the inertial data is not synchronized with the computed acceleration, the method continues to block 730. If the inertial data and the computed acceleration are synchronized, the method continues to block 735.

At block 730, the computing device matches up vectors of the first set (inertial data) to close in time vectors of the second set (computed acceleration) based on the magnitudes of the vectors. For example, if a vector in the first set is a tenth of a second off from a vector in the second set, but the two vectors have an approximately equal magnitude, then the vectors may be aligned in time. By aligning all of the vectors of the first set with corresponding vectors of the second set, the inertial data and the computed acceleration become synchronized.

At block 735, the received inertial data is reconciled with the computed acceleration to complete calibration of the positional sensor. Reconciling the inertial data with the computed acceleration includes determining the rotations necessary to align the frames of reference. Reconciling the inertial data with the computed acceleration includes calculating a pitch of the positional sensor and a relative yaw between the positional sensor and the tracked object.

The pitch and yaw may be separately computed for each pair of a vector from the inertial data and the corresponding vector from the computed acceleration. Due to signal noise, the pitch and yaw computed for different vector pairs may not coincide. In one embodiment, the pitch and yaw is averaged over the multiple vector pairs to provide a more accurate solution. The vector pairs may also be weighted and or filtered to further increase the accuracy of the pitch and yaw.

In one embodiment, at block 740 vectors having a magnitude less than an acceleration threshold are filtered out from the computed acceleration and from the inertial data. Received inertial data has an uncertainty that is defined by an amount of signal noise that accompanies the inertial data. As the magnitude of accelerations measured by the object decreases, a signal to noise ratio increases. A decrease in the signal to noise ratio causes the inertial data to become less accurate. Therefore, a minimum acceleration threshold may be set to minimize error.

In one embodiment, at block 745 vectors are weighted based on magnitude. Vectors having a greater magnitude (representing larger accelerations) are weighted more heavily than vectors with smaller magnitudes. The greater the magnitude of a vector, the less the vector is influenced by noise (e.g., the greater the signal to noise ratio). Therefore, accuracy of the calibration can be increased by weighting the vectors. Vectors may be weighted linearly based on the magnitude, weighted based on the square of the magnitude, or weighted according to other weighting functions. For some weighting techniques, it may be unnecessary to filter the vectors as performed at block 740. For example, if the weight function is based on the square of the vector's magnitude, vectors having a small magnitude may be weighted to approximately zero.

Methods 600 and 700 calibrate a tracking system to find a positional sensor's orientation relative to a frame of reference of an object and/or relative to a world reference frame in a manner that is convenient and easy for a user to perform. Both methods enable a computing device to accurately calibrate a tracking system based on minimal user input.

In some tracking systems that include a camera, a field of view (FOV) of the camera may already be known. However, some tracking systems may not include information that identifies the camera's field of view. For example, a camera with an unknown fixed field of view may be included in the tracking system. Alternatively, a camera with multiple known field of view settings may be included in the tracking system, but it may not be readily apparent which field of view setting has been selected. In such embodiments, in which the field of view of the camera is unknown, different fields of view may be guessed until an actual field of view is determined, or the field of view may be solved for.

In one embodiment, in which the field of view of the camera is unknown, multiple different fields of view are assumed. Methods 600 and 700 may be performed independently for each assumed field of view. The assumed field of view that provides the smallest difference between the rotated reference frame (e.g., of the positional sensor) and the non-rotated reference frame (e.g., the world reference frame) is then determined to be the correct field of view.

In some tracking systems, a size of the tracked object may not be known. In such embodiments, different object sizes may be guessed until an actual object size is determined, or the object size may be solved for. In one embodiment, in which the object size is unknown, multiple different object sizes are assumed. Methods 600 and 700 may be performed independently for each assumed object size. The assumed object size that provides the smallest difference between the rotated reference frame (e.g., of the positional sensor) and the non-rotated reference frame (e.g., the world reference frame) is then determined to be the correct object size.

Figure 8:
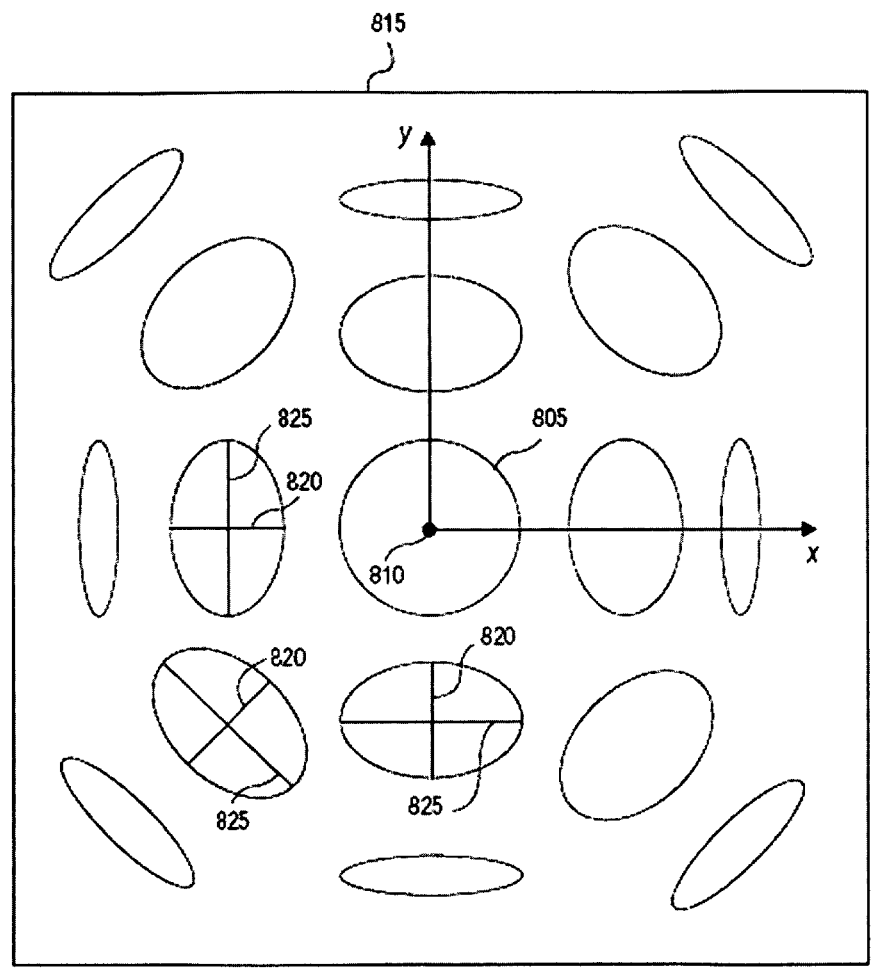
FIG. 8 illustrates a sphere projected onto different points of a camera's imaging plane, in accordance with one embodiment of the present invention.

One method of solving for an unknown field of view is based on the elliptical projection of a tracked sphere of known size onto an image plane of the camera. A similar method may also be used to solve for an unknown sphere size provided that the field of view is known. If a sphere lies on a plane that is not perpendicular to a line of vision, then it will project as an ellipse. This phenomenon can be observed in FIG. 8, which illustrates a sphere projected onto an imaging plane of a camera at different points in the camera's image plane 815, in accordance with one embodiment of the present invention. As shown, a perfect circle 805 is projected onto the camera's imaging plane when the sphere is positioned at a center 810 of the image plane 815. As the sphere moves away from the center 810 of the image plane 815, the sphere projects as an ellipse. Each ellipse can be represented by a major axis 825 and a minor axis 820. As shown, the minor axis 820 of the ellipse always points towards the center 810 of the field of view 815. The further the sphere moves from the center 810 of the image plane 815, the smaller the minor axis 820 of the ellipse becomes.

Figure 9:
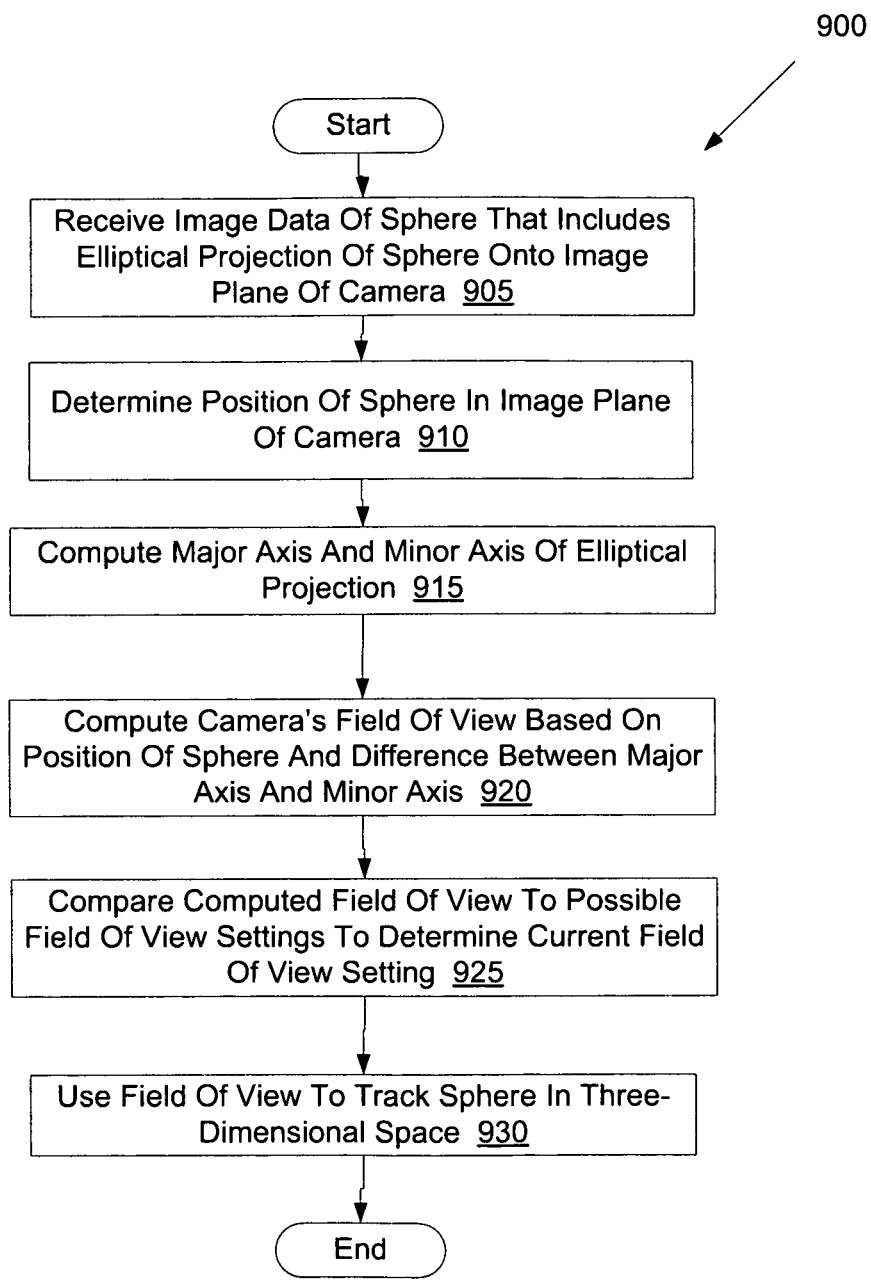
FIG. 9 illustrates a flow diagram of one embodiment for a method of determining a field of view of a camera using an elliptical projection of a sphere onto an imaging plane of a camera.

FIG. 9 illustrates a flow diagram of one embodiment for a method 900 of determining a field of view of a camera using an elliptical projection of a sphere onto an imaging plane of the camera. Method 900 may also be used to determine an unknown object size provided that the field of view of the camera is known. The method may be performed by processing logic that may comprise hardware (e.g., circuitry, dedicated logic, programmable logic, microcode, etc.), software (such as instructions run on a processing device), or a combination thereof. In one embodiment, method 900 is performed by computing device 115 of FIG. 1.

Referring to FIG. 9, at block 905 a computing device receives image data of a sphere. The image data of the sphere is projected onto an imaging plane of a camera as an ellipse whose minor axis points towards a center of the image. At block 910, the computing device determines a position of the sphere in the image plane of the camera. The center of the ellipse is located, and represented as a distance from the center of the image. At block 915, a major axis a and minor axis b of the ellipse are computed according to the following equations:

$$a = \frac{2rf\sqrt{\left(\frac{i_x Z}{f}\right)^2 + \left(\frac{i_y Z}{f}\right)^2 + Z^2 - r^2}}{Z^2 - r^2}$$ (equation 16)

$$b = \frac{2rf\sqrt{Z^2 - r^2}}{Z^2 - r^2}$$ (equation 17)

Where $i_x$ represents the horizontal size of the image (e.g., in pixels), $i_y$ represents the vertical size of the image (e.g., in pixels), Z is the distance between the camera and the sphere, r is the radius of the sphere and f is the distance from the center of the elliptical projection to a center of the image (e.g., in pixels).

Figure 10:
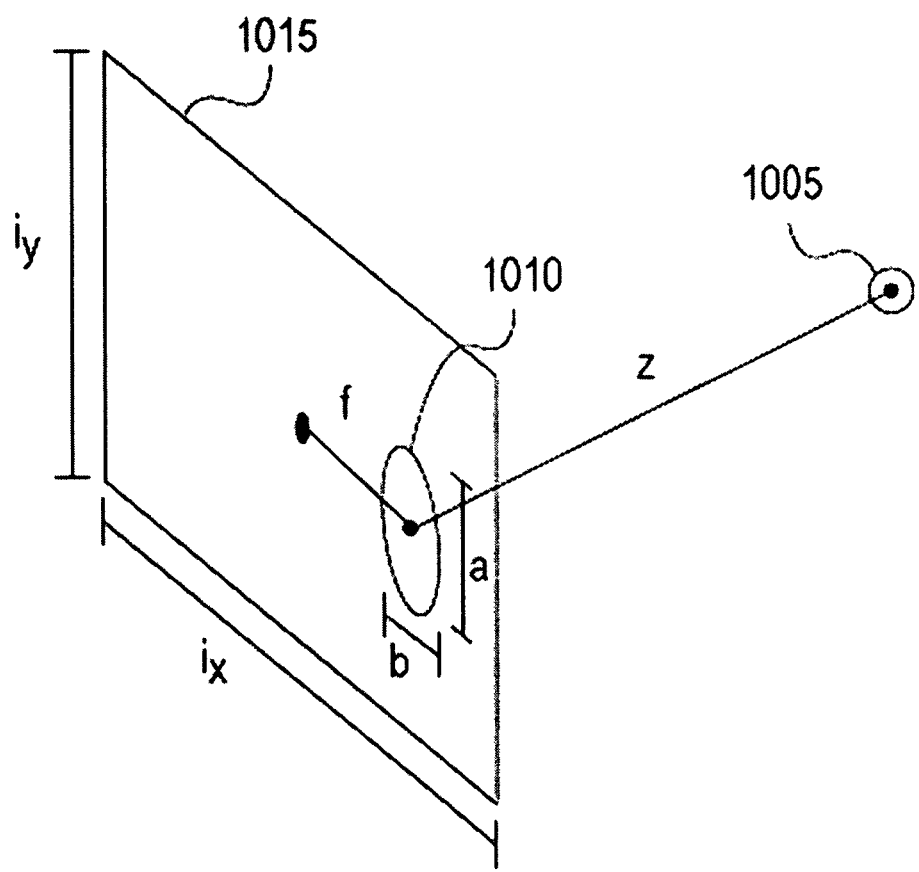
FIG. 10 which illustrates a sphere projected as an ellipse onto an image plane of a camera, in accordance with one embodiment of the present invention.

Equations 16 and 17 can be better understood with reference to FIG. 10, which illustrates a sphere 1005 projected as an ellipse 1010 onto an image plane 1015 of a camera, in accordance with one embodiment of the present invention.

Returning to FIG. 9, at block 920 the computing device computes the camera's field of view based on a position of the projection in the image and a ratio between the major axis and the minor axis of the ellipse. The ratio of the major axis to the minor axis is dependent upon the position of the ellipse's center in the image. Accordingly, the ratio can be determined based on the position of the ellipse in the image. Moreover, it can be assumed that the distance between the sphere and the camera is much greater than the radius of the sphere. Making such an assumption, $(Z^2 - r^2)$ is approximately equal to $Z^2$. Accordingly, the ratio between the major axis and minor axis can be represented as:

$$\text{ratio} = \frac{a}{b} = \sqrt{1 + \frac{i_x^2 + i_y^2}{f^2}}$$ (equation 18)

The distance f can then be expressed as:

$$f = \sqrt{\frac{i_x^2 + i_y^2}{\left(\frac{a}{b}\right)^2 - 1}}$$ (equation 19)

The distance f can be converted to the field of view. The distance f can then be used to compute a horizontal field of view $FOV_x$ and a vertical field of view $FOV_y$ using standard trigonometric functions, as follows:

$$FOV_x = 2\arctan\left(\frac{w}{2f}\right)$$ (equation 20)

$$FOV_y = 2\arctan\left(\frac{h}{2f}\right)$$ (equation 21)

Where w is the image width in pixels and h is the image height in pixels.

At block 925, the computed field of view is compared to possible field of view settings. The actual field of view is then determined to be a field of view of the closest field of view setting to the computed field of view. In one embodiment, in which an elliptical distortion of the sphere in the projected image is slight (e.g., there is only a slight difference between the major axis and the minor axis of the ellipse), an error in the computed field of view is large. In such an embodiment, the computed field of view is a field of view range. The actual field of view can fall anywhere within the field of view range. The field of view range is compared to the field of view settings, and the field of view is determined to be the field of view setting that falls within the computed field of view range.

At block 930, the field of view is used to track a sphere in three dimensional space using a camera. The method then ends.

Figure 11:
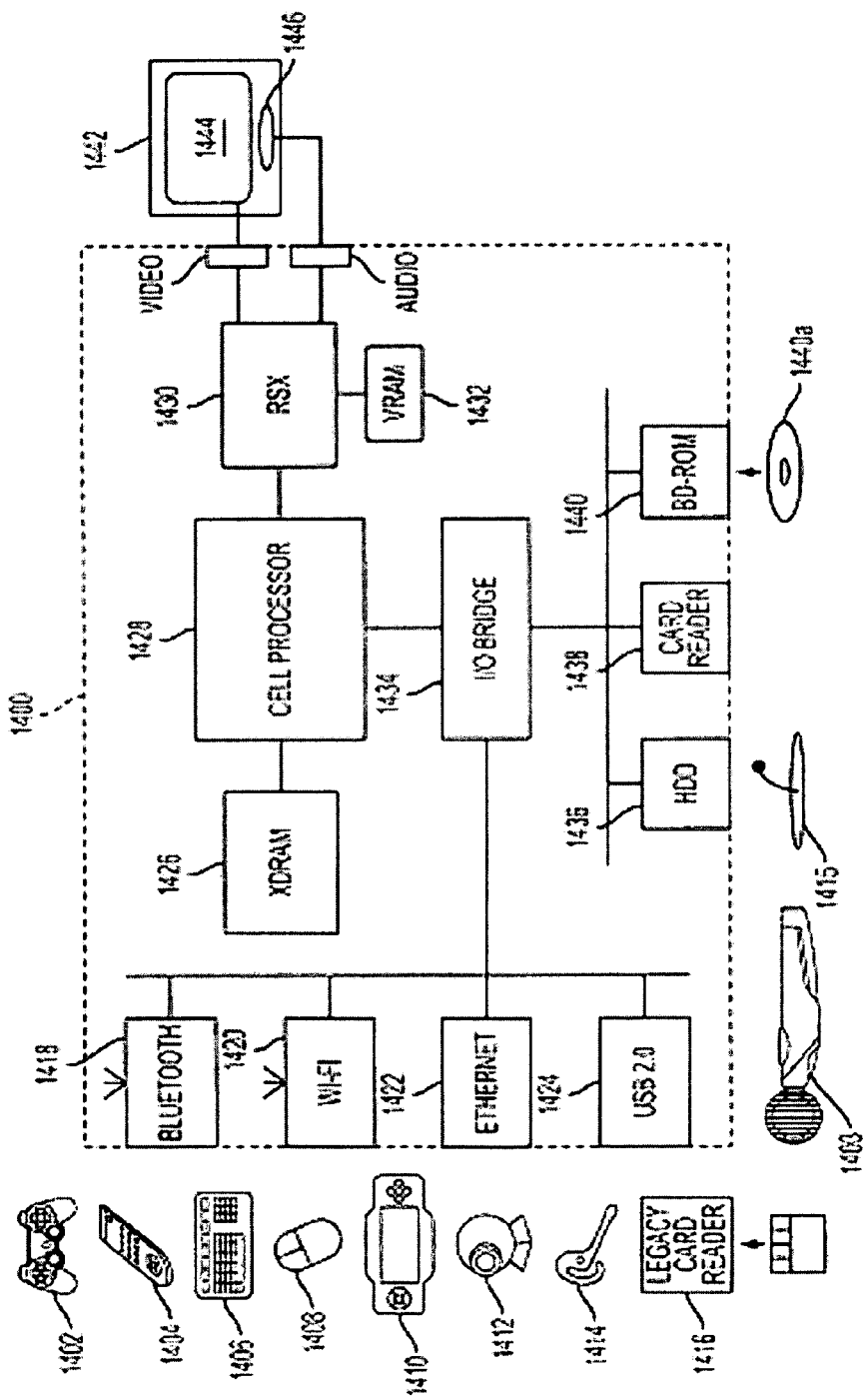
FIG. 11 illustrates hardware and user interfaces that may be used to determine controller location, in accordance with one embodiment of the present invention.

FIG. 11 illustrates hardware and user interfaces that may be used to determine controller location, in accordance with one embodiment of the present invention. FIG. 11 schematically illustrates the overall system architecture of the Sony® Playstation 3® entertainment device, a console that may be compatible for implementing a three-dimensional controller locating system in accordance with one embodiment of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to multiple Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as LEDs or infrared lights, microphone and speaker for ultrasound communications, an acoustic chamber, a digital camera, an internal clock, a recognizable shape such as a spherical section facing the game console, and wireless communications using protocols such as Bluetooth®, WiFi™, etc.

Game controller 1402 is a controller designed to be used with two hands, and game controller 1403 is a single-hand controller with a ball attachment, as previously described in FIGS. 1A-4A. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 12:
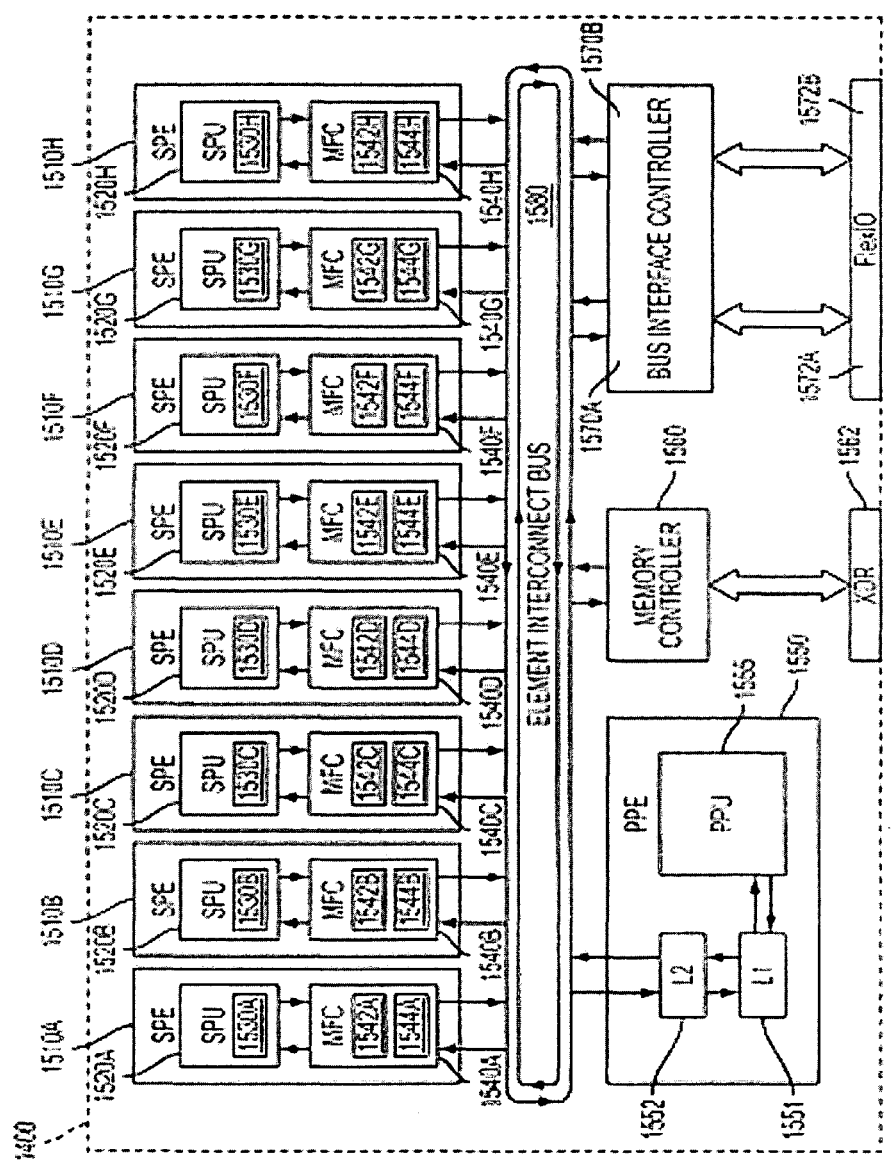
FIG. 12 illustrates additional hardware that may be used to process instructions, in accordance with one embodiment of the present invention.

FIG. 12 illustrates additional hardware that may be used to process instructions, in accordance with one embodiment of the present invention. Cell processor 1428 of FIG. 11 has an architecture comprising four basic components: external input and output structures comprising a memory controller 1560 and a dual bus interface controller 1570A,B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method of calibrating a tracking system, comprising:
   receiving positional data of a tracked object from a positional sensor by a video game console as the tracked object is moved through a rich motion path in at least two dimensions, wherein the tracked object exceeds a minimum acceleration threshold;
   receiving inertial data from measured accelerations along a single axis or multiple axes or from measured angular accelerations corresponding to the tracked object by the video game console as the tracked object is moved through the rich motion path;
   converting the positional data to a three-dimensional coordinate system of the positional sensor;
   computing an acceleration of the tracked object in the three-dimensional coordinate system of the positional sensor based on the converted positional data; and
   reconciling the inertial data with the computed acceleration.

2. The method of claim 1, wherein the positional sensor is a video camera, wherein the positional data includes a plurality of image locations and image sizes, and wherein converting the positional data includes converting each of the plurality of image locations to the three-dimensional coordinate system of the positional sensor based on the corresponding image sizes and a field of view of the video camera.

3. The method of claim 1, wherein the rich motion path includes at least one of a motion towards the positional sensor or a motion away from the positional sensor.

4. The method of claim 1, wherein the tracked object maintains an approximately fixed pitch and roll as it is moved through the rich motion path, the approximately fixed pitch and roll enabling the inertial data to be reconciled with the computed acceleration without converting the inertial data to a three-dimensional world coordinate system.

5. The method of claim 1, further comprising:
converting the received inertial data into a three-dimensional world coordinate system, the three-dimensional world coordinate system having an axis that is aligned with gravity.

6. The method of claim 1, wherein the inertial data includes a first set of vectors and the computed acceleration includes a second set of vectors, and wherein reconciling the inertial data with the computed acceleration comprises:
determining a first angle between the first set of vectors and the second set of vectors that is representative of a pitch of the positional sensor; and
determining a second angle between the first set of vectors and the second set of vectors that is representative of a relative yaw between the positional sensor and the tracked object.

7. The method of claim 6, wherein reconciling the inertial data with the computed acceleration further comprises:
selecting a plurality of potential first angles and a plurality of potential second angles;
rotating the first set of vectors by each combination of one of the plurality of potential first angles and one of the plurality of potential second angles;
finding a difference between the rotated first set of vectors and the second set of vectors for each combination of one of the plurality of potential first angles and one of the plurality of potential second angles; and
identifying a combination of a first potential angle and a second potential angle that causes the smallest difference between the rotated first set of vectors and the second set of vectors as the first angle and the second angle.

8. The method of claim 6, wherein reconciling the inertial data with the computed acceleration further comprises:
determining a three-dimensional angle between the first set of vectors and the second set of vectors; and
decomposing the three-dimensional angle into the first angle and the second angle.

9. The method of claim 6 further comprising:
for each vector in the first set of vectors and in the second set of vectors, filtering out the vector if it has a magnitude that is smaller than a minimum threshold.

10. The method of claim 6, further comprising:
weighting each vector in the first set of vectors and in the second set of vectors based on a magnitude of the vector, wherein vectors having a higher magnitude are weighted more heavily than vectors having a lower magnitude.

11. The method of claim 6, further comprising:
comparing the magnitude of each vector of the first set of vectors to close in time vectors from the second set of vectors; and
if a first vector of the first set of vectors is approximately equal in magnitude to a close in time second vector of the second set of vectors, determining that the first vector represents a motion in a three dimensional world coordinate system and the second vector represents the motion in the three dimensional coordinate system of the positional sensor.

12. The method of claim 1, wherein the positional sensor is one of a camera, a z-camera, an ultrasonic sensor or a photonic sensor.

13. The method of claim 1, wherein the inertial data is gathered by an inertial sensor having a fixed displacement from a centroid of the tracked object, the method further comprising:
applying an offset to one of the inertial data or the computed acceleration based on measurements provided by a gyroscope and a known distance between the accelerometer and the centroid, wherein the offset compensates for the fixed displacement.

14. The method of claim 1, wherein a field of view of the positional sensor is unknown, the method further comprising:
solving for the field of view of the positional sensor.

15. The method of claim 14, wherein solving for the field of view comprises:
assuming one or more potential fields of view;
for each potential field of view, attempting to reconcile the inertial data with the computed acceleration; and
identifying the potential field of view for which the inertial data is best able to reconcile with the computed acceleration as the field of view of the positional sensor.

16. A non-transitory computer readable storage medium including instructions that, when executed by a processing system, cause the processing system to perform a method comprising:
receiving a positional data of a tracked object from device positional sensor as the tracked object is moved through a rich motion path in at least two dimensions, wherein the tracked object exceeds a minimum acceleration threshold;
receiving inertial data from measured accelerations along a single axis or multiple axes or from measured angular accelerations corresponding to the tracked object by as the tracked object is moved through the rich motion path;
converting the positional data to a three-dimensional coordinate system of the positional sensor;
computing an acceleration of the tracked object in the three-dimensional coordinate system of the positional sensor based on the converted positional data; and
reconciling the inertial data with the computed acceleration.

17. The non-transitory computer readable storage medium of claim 16, wherein the positional sensor is a video camera, wherein the positional data includes a plurality of image locations and image sizes, and wherein converting the positional data includes converting each of the plurality of image locations to the three-dimensional coordinate system of the positional sensor based on the corresponding image sizes and a field of view of the video camera.

18. The non-transitory computer readable storage medium of claim 16, wherein the inertial data includes a first set of vectors and the computed acceleration includes a second set of vectors, and wherein reconciling the inertial data with the computed acceleration comprises:
determining a first angle between the first set of vectors and the second set of vectors that is representative of a pitch of the positional sensor; and
determining a second angle between the first set of vectors and the second set of vectors that is representative of a relative yaw between the positional sensor and the tracked object.

19. The non-transitory computer readable storage medium of claim 16, wherein the field of view of the positional sensor is unknown, and wherein the tracked object is a sphere the method further comprising:
solving for the field of view of the positional sensor, wherein solving for the field of view comprises:
receiving image data of the sphere, the image data including an elliptical projection of the sphere onto an image plane of the positional sensor;
determining a position of the sphere in the image plane of the positional sensor from the image data;

computing a major axis and a minor axis of the elliptical projection;

computing the positional sensor's field of view based on the position of the sphere and a difference between the major axis and the minor axis.

20. A tracking system, comprising:

a tracked object that includes one or more inertial sensors, the tracked object to gather inertial data from measured accelerations along a single axis or multiple axes or from measured angular accelerations as the tracked object is moved through a rich motion path in at least two dimensions, wherein the tracked object exceeds a minimum acceleration threshold, and to transmit the inertial data to a computing device;

device positional sensor to gather positional data of the tracked object as the tracked object is moved through the rich motion path, and to transmit the positional data to the computing device; and the computing device, to receive the inertial data and the positional data, to convert the positional data to a three-dimensional coordinate system of the positional sensor, to compute an acceleration of the tracked object in the three-dimensional coordinate system of the positional sensor based on the converted positional data, and to reconcile the inertial data with the computed acceleration.

21. The tracking system of claim 20, wherein the positional sensor is a video camera, wherein the positional data includes a plurality of image locations and image sizes, and wherein converting the positional data includes converting each of the plurality of image locations to the three-dimensional coordinate system of the positional sensor based on the corresponding image sizes and a field of view of the video camera.

22. The tracking system of claim 21, wherein the rich motion path includes at least one of a motion towards the positional sensor or a motion away from the positional sensor.

23. The tracking system of claim 21, further comprising:

the computing device to convert the received inertial data into a three-dimensional world coordinate system, the three-dimensional world coordinate system having an axis that is aligned with gravity.

24. The tracking system of claim 21, wherein the inertial data includes a first set of vectors and the computed acceleration includes a second set of vectors, and wherein reconciling the inertial data with the computed acceleration comprises:

determining a first angle between the first set of vectors and the second set of vectors that is representative of a pitch of the positional sensor; and determining a second angle between the first set of vectors and the second set of vectors that is representative of a relative yaw between the positional sensor and the tracked object.

25. The tracking system of claim 24, wherein reconciling the inertial data with the computed acceleration further comprises:

selecting a plurality of potential first angles and a plurality of potential second angles;

rotating the first set of vectors by each combination of one of the plurality of potential first angles and one of the plurality of potential second angles;

finding a difference between the rotated first set of vectors and the second set of vectors for each combination of one of the plurality of potential first angles and one of the plurality of potential second angles; and identifying a combination of a first potential angle and a second potential angle that causes the smallest difference between the rotated first set of vectors and the second set of vectors as the first angle and the second angle.

26. The tracking system of claim 24, wherein reconciling the inertial data with the computed acceleration further comprises:

determining a three-dimensional angle between the first set of vectors and the second set of vectors; and decomposing the three-dimensional angle into the first angle and the second angle.

27. The tracking system of claim 24, further comprising:

the computing device to filter out each vector in the first set of vectors and in the second set of vectors that has a magnitude that is smaller than a minimum threshold.

28. The tracking system of claim 24, further comprising:

the computing device to weight each vector in the first set of vectors and in the second set of vectors based on a magnitude of the vector, wherein vectors having a higher magnitude are weighted more heavily than vectors having a lower magnitude.

29. The tracking system of claim 24, further comprising:

the computing device to compare the magnitude of each vector of the first set of vectors to close in time vectors from the second set of vectors, and if a first vector of the first set of vectors is approximately equal in magnitude to a close in time second vector of the second set of vectors, to determine that the first vector represents a motion in a three dimensional world coordinate system and the second vector represents the motion in the three dimensional coordinate system of the positional sensor.

30. The tracking system of claim 21, wherein the positional sensor is one of a camera, a z-camera, an ultrasonic sensor or a photonic sensor.

31. The tracking system of claim 21, wherein the one or more inertial sensors have a fixed displacement from a centroid of the tracked object, the tracking system further comprising:

the computing device to apply an offset to one of the inertial data or the computed acceleration based on measurements provided by a gyroscope and a known distance between the accelerometer and the centroid, wherein the offset compensates for the fixed displacement.

32. The tracking system of claim 21, wherein the field of view of the positional sensor is unknown, further comprising:

the computing device to solve for the field of view of the positional sensor.

33. The tracking system of claim 32, wherein solving for the field of view comprises:

assuming one or more potential fields of view;

for each potential field of view, attempting to reconcile the inertial data with the computed acceleration; and identifying the potential field of view for which the inertial data is best able to reconcile with the computed acceleration as the field of view of the positional sensor.

* * * * *